US005211265A

United States Patent [19]

Gregg

[11] Patent Number: 5,211,265
[45] Date of Patent: May 18, 1993

[54] SNOWMOBILE LIFT

[76] Inventor: Patrick G. Gregg, R1 Box 215, Christmas, Mich. 49862

[21] Appl. No.: 850,340

[22] Filed: Mar. 11, 1992

[51] Int. Cl.$^5$ .............................................. B60S 13/00

[52] U.S. Cl. .................................. 187/8.75; 187/8.71; 254/122

[58] Field of Search .......................... 187/18, 8.41, 8.71, 187/8.78, 8.74, 8.67; 254/122, 10 C, 2 R; 182/141

[56] References Cited

U.S. PATENT DOCUMENTS

| | | | |
|---|---|---|---|
| 1,889,185 | 11/1932 | Stukenborg | 187/8.75 |
| 2,704,584 | 3/1955 | Tzschoppe | 187/8.75 |
| 2,899,020 | 8/1959 | Halstead | 187/8.75 |
| 3,362,502 | 1/1968 | Clarke | 187/8.72 |
| 3,404,791 | 10/1968 | Larson | 214/38 |
| 3,409,791 | 10/1968 | Larson | 214/38 |
| 3,463,272 | 8/1969 | Prescott | 157/8.72 |
| 3,747,778 | 7/1973 | Collins, Jr. | 214/1 A |
| 3,788,414 | 1/1974 | Netter | 187/8.71 |
| 3,863,890 | 2/1975 | Ruffing | 254/10 C |
| 3,901,356 | 8/1975 | Butler | 187/8.71 |
| 4,577,821 | 3/1986 | Edmo et al. | 248/421 |
| 4,724,930 | 2/1988 | VanLierop | 187/8.43 |
| 4,804,068 | 2/1989 | Carter | 187/8.72 |
| 4,858,888 | 8/1989 | Cruz et al. | 254/122 |

*Primary Examiner*—Robert P. Olszewski
*Assistant Examiner*—Kenneth Noland
*Attorney, Agent, or Firm*—Varnum, Riddering, Schmidt & Howlett

[57] ABSTRACT

A scissor-type snowmobile lift comprised of first and second cross members, rails, a pair of scissor members, two mounting brackets, a lower cross member and a hydraulic cylinder. The rails and first and second cross members form a lift frame. The first and second cross members are spaced so they contact the bellypan of the snowmobile. The rails are spaced so that the snowmobile track lies between the rails. The snowmobile is placed or driven onto the lift frame. As the lift frame is raised, the first and second cross members contact the bellypan and the rails contact the frame or running boards of the snowmobile, causing the raising of the snowmobile while keeping the skis and tracks free of the lift frame for maintenance and repair.

20 Claims, 4 Drawing Sheets

SNOWMOBILE LIFT

BACKGROUND OF THE INVENTION

1. Field of the Invention

This invention relates to scissor-type lift devices and more particularly, to a scissor-type lift device for lifting a snowmobile such that the skis and the track of the snowmobile are suspended so that they are easily accessible for servicing or repair.

2. Description of the Related Art

Scissor-type lifts are well known. For example, the U.S. Pat. No. 4,577,821 to Edmo et al., Larson, U.S. Pat. No. 3,404,791, and Cruz et al., U.S. Pat. No. 4,858,888, all disclose a scissor-type lift comprising a table top or upper framework, base portion, scissors and hydraulic cylinder. Each scissor member is comprised of first and second arms which are pivotably connected to each other. The upper portion of either the first or second arm is rotatably connected to the table top or the upper framework. The upper end of the other scissor member rides along the table top or the upper framework by a wheel connected to the end of the scissor member. The lower end of the scissor member that rides along the table top or upper framework is rotatably connected to a base portion. The other end of the scissor member rotatably connected to the table top or the upper framework rides along the base portion by a wheel mounted to the lower end of the scissor member. The hydraulic cylinder is normally connected to the first and second arms so that as the hydraulic cylinder is extended, the scissor members open from their closed position, causing the table top or upper framework to raise.

In operation, the object being lifted is placed onto the table top or the upper framework. As the hydraulic cylinders are extended, the scissor members open and raise the table top or upper framework until the object obtains the desired height.

This type of construction is unacceptable for lifting a snowmobile for maintenance work, especially when the skis and track must be serviced. When the snowmobile is placed or driven onto the table top or upper framework, the skis and track of the snowmobile rest on the table top or the upper framework, preventing maintenance or repair of the skis and track unless they are subsequently freed from the table top or upper framework by some other means. An acceptable snowmobile lift must provide for the skis and track of the snowmobile to be suspended free of the support surfaces for easy maintenance and repair.

SUMMARY OF THE INVENTION

The invention relates to a lift mechanism for a snowmobile having a frame, running boards, bellypan, track and skis, all of predetermined dimensional relationships. The lift mechanism is comprised of a lift frame adapted to support a snowmobile and a mechanism for raising the lift frame from a lowered position to a raised position. The improvement is a lift frame comprising a pair of spaced apart parallel rails which are joined to a pair of cross members. One of the cross members is positioned at one end of the rails and the other cross member is positioned at a central portion of the rails. The cross members are positioned such that at least one of the cross members support only the snowmobile frame or bellypan during lifting, thereby suspending the skis and the track for servicing. The spacing between the parallel rails is narrow enough so that the skis of the snowmobile will straddle the rails and far enough apart that the track of the snowmobile will lie between the rails when the snowmobile is placed on the lifting frame.

The lift mechanism is comprised of at least two scissor members which are connected at an upper end to the lift frame. Each scissor member is comprised of first and second arms which are pivotably mounted to each other and one of the arms is pivotably connected at an upper end to a front portion of the lift frame. The upper portion of the other arm of the scissor member is movably mounted to an upper portion of the lift frame. Wheels are mounted to the upper portion of the other arm of the scissor member for rolling interface between the other arm and the lift frame rails. Each rail has a ramp which makes contact with the wheel mounted to the upper portion of the other arm of the scissor member which causes the end of the lift frame with the ramp to raise higher than the other end of the lift frame. As the wheel moves during lifting. A fluid cylinder is mounted to the first and second arms.

In use, the snowmobile lift lies flat on the floor and the snowmobile is driven or placed onto the lift. As the hydraulic cylinder is extended, a moment is applied to the pivot point of the scissor members, causing the scissor members to open. As the scissor members open, the wheels of the first arms and the wheels of the second arms move towards the front of the lift. The upper wheels then engage the wedge-shaped flange, causing the rails to raise higher in the back than in the front, resulting in the rails sloping downwards toward the front of the lift. The distance between the rails is such that the skis of the snowmobile will straddle the rails, and the track of the snowmobile will lie between the longitudinal rails. As the lift is raised, at least one of the horizontal support members make contact with the bellypan of the snowmobile and the rails contact the frame or running boards of the snowmobile, lifting the snowmobile while leaving the track and skis free so that they can be repaired.

BRIEF DESCRIPTION OF THE DRAWINGS

The invention will now be described with reference to the drawings in which.

DETAILED DESCRIPTION OF THE PREFERRED EMBODIMENT OF THE INVENTION

Figure 1:
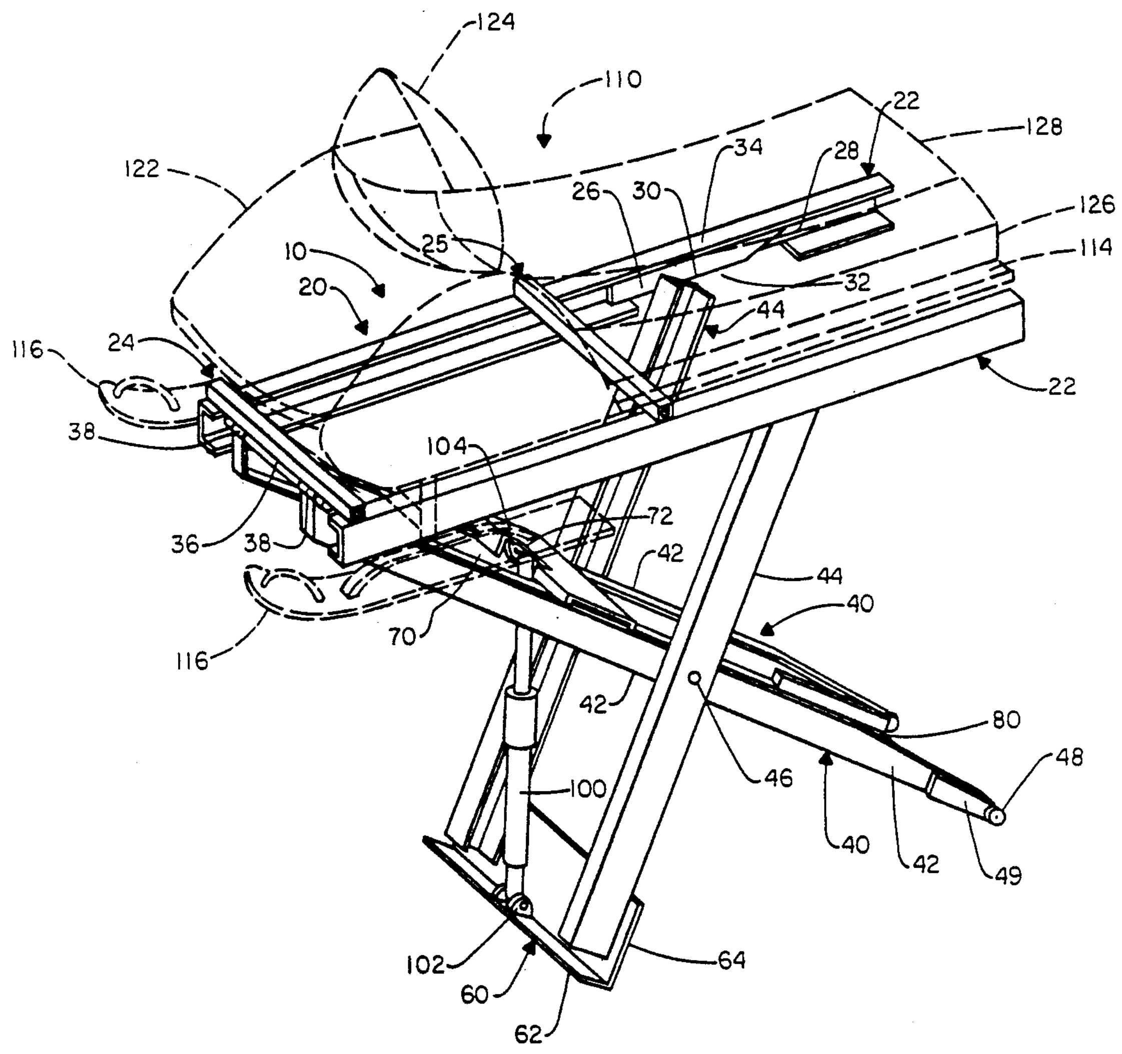
FIG. 1 is a perspective view of the snowmobile lift in an upper position with a snowmobile shown in phantom lines.

Turning first to FIG. 1, there is shown the preferred embodiment of the snowmobile lift 10 which is comprised of a lift frame 20, two scissor members 40 and a hydraulic cylinder 100.

Scissor-type lifts are well known. In accordance with the invention, scissor members 40 are connected to the lift frame 20 to provide for the lifting of the lift frame 20. The scissor members 40 are each further comprised of a first arm 42 and a second arm 44. The first arm 42 and the second arm 44 are pivotally connected at a pivot point 46. Preferably, the arms are pivotally connected at their midpoint. The arms 42, 44 can be of any shape, but are preferably C-shaped in cross-section.

The C-shaped arms 42, 44 also have a main portion 50, an upper flange 52 and a lower flange 54 that extend the length of the arms 42, 44. An upper wheel 34 is rotatably mounted, at the upper end of the second arm 44, to the outer surface of the main portion 50 of the second arm 44. The upper wheel 34 rides along the underside of the upper flange 52 of a rail 22 (described below), and further rides along an incline plane 28 and a horizontal track 30 of the ramp 26. The upper wheel 34 can be of any diameter.

The lower end of the second arms 44 are rigidly connected by a lower mounting bracket 60. Preferably, the lower mounting bracket is L-shaped in cross section with a vertical flange 64 and a horizontal flange 62. The lower mounting bracket 60 is rigidly mounted to the vertical flange 64 of the lower mounting bracket 60.

The first arms 42 are rotatably connected to the lift frame 20. Preferably, a bushing 38 (FIG. 4) is rigidly mounted to the upper end of the first arm 42. A complementary bushing 38 is rigidly mounted to the lower surface of a first cross member 24 of the lift frame 20. A mounting rod 36 is slidably mounted into and through the complementary bushings 38, and the mounting rod is held in place by a cotter pin (not shown in drawings).

Figure 5:
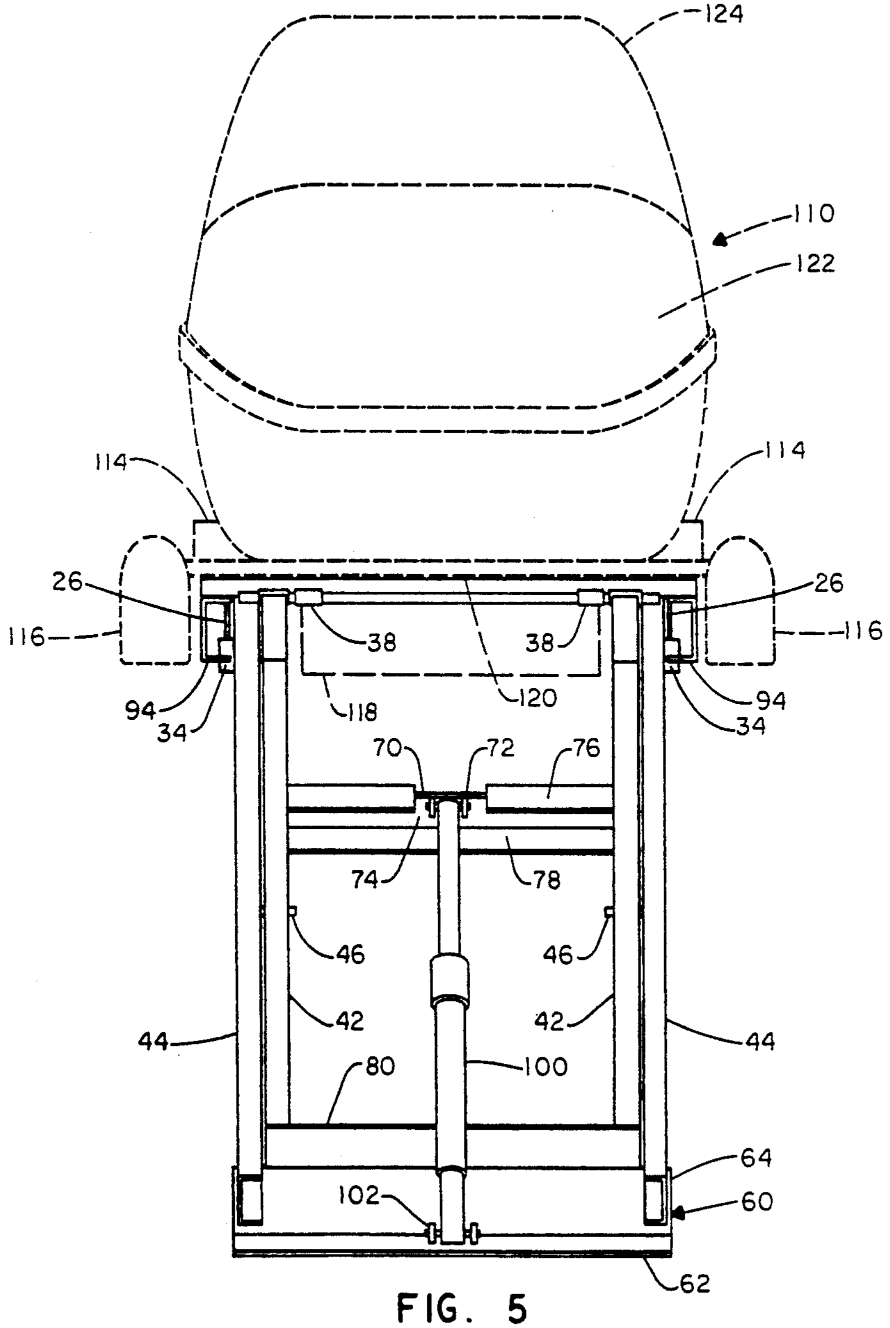
FIG. 5 is a front view of the snowmobile lift in an upper position with a snowmobile shown in phantom lines.

An upper mounting bracket 70 (FIG. 1) is rigidly mounted to the first arms 42. The upper mounting bracket 70 can be of any shape, but is preferably C-shaped in cross section like the scissor members 40 and also has a main portion 74, upper flange 76 and a lower flange 78. In the preferred embodiment, the upper flange 76 and lower flange 78 of the upper mounting bracket 70 are rigidly mounted to the upper flange 52 of each first arm 42 (FIG. 5). A portion of the upper flange 76 and the main portion 74 of the upper cross member 70 is cut away as shown at 104 so the hydraulic cylinder 100 does not contact the upper flange 76 when the lift frame 20 is lowered.

A wheel mounting assembly 49 is rigidly connected to the lower end of the first arms 42. A lower wheel 48 is rotatably mounted to the wheel mounting assembly 49. The wheel mounting assembly 49 can be either a single or multi-part piece.

A lower cross member 80 rigidly connects the lower ends of the first arms 42. The lower cross member 80 is preferably a thin metal sheet which is rigidly mounted to the lower flange 54 of the first arm 42 and the wheel mounting assembly 49.

In accordance with the invention, the hydraulic cylinder 100 (FIG. 1) is connected to the second arms 44 and the first arms 42. Preferably, the hydraulic cylinder 100 is rotatably connected at its upper end to the upper mounting bracket 70, and is also rotatably connected at its lower end to the horizontal flange 62 of the lower mounting bracket 60. The lower end of the hydraulic cylinder 100 is rotatably mounted to the lower mounting bracket 60 and the upper end of the hydraulic cylinder 100 is rotatably connected to the upper mounting bracket 70 by passing a pin (not shown in the drawings) through the respective mounting members and the respective ends of the hydraulic cylinder. The lower mounting members 102 and the upper mounting members 104 are rigidly connected to the horizontal flange 62 of the lower mounting bracket 60 and the main portion 74 of the upper mounting bracket 70, respectively.

Figure 4:
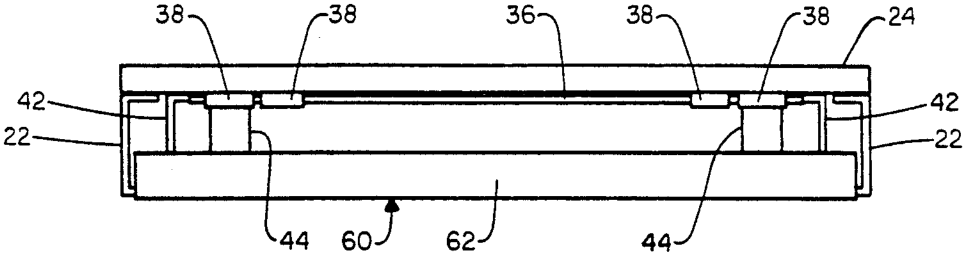
FIG. 4 is a front view of the snowmobile lift in a lowered state.

As most clearly shown in FIGS. 1 and 4, the lift frame 20 is comprised of rails 22, first cross member 24, second cross member 25 and mounting rod 36. The rails 22 are also preferably C-shaped in cross-section with a main portion 90, an upper flange 92 and a lower flange 94. The upper flange 92 and the lower flange 94 extend perpendicular to and outwardly from the main portion 90 of the rail 22. The cross members 24, 25 can also be of any shape, but are preferably square-shaped in cross section.

Figure 2:
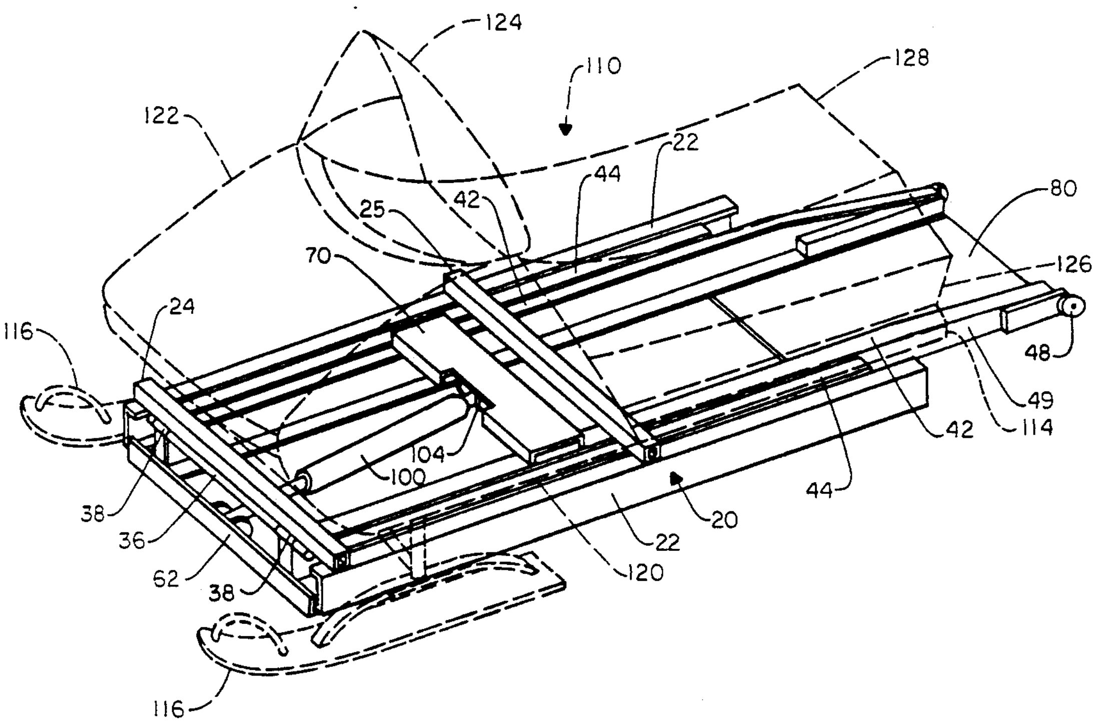
FIG. 2 is a perspective view of the snowmobile lift in a lowered position with a snowmobile shown in phantom lines.

The cross members 24, 25 are rigidly mounted to the rails 22 (FIGS. 1 and 2). In the preferred embodiment, the square-shaped support members are welded to the upper flange 92 of the rails 22. The first cross member 24 is rigidly mounted to the forward end of the rails 22. The second cross member 25 is mounted at a distance away from the first support cross member, provided the distance is such that the bellypan 120 of a snowmobile 110 will contact at least one of the cross members during lifting (FIG. 5). The distance between the rails 22 and, likewise, the length of the cross members 24, 25 can be of any length, provided the distance between the rails is narrow enough that the skis 116 of the snowmobile 110 will straddle the rails 22 (FIG. 5) and the cross members 24, 25, and wide enough so the track 118 of the snowmobile 110 can be positioned between the rails 22 (FIG. 5).

Figure 3:
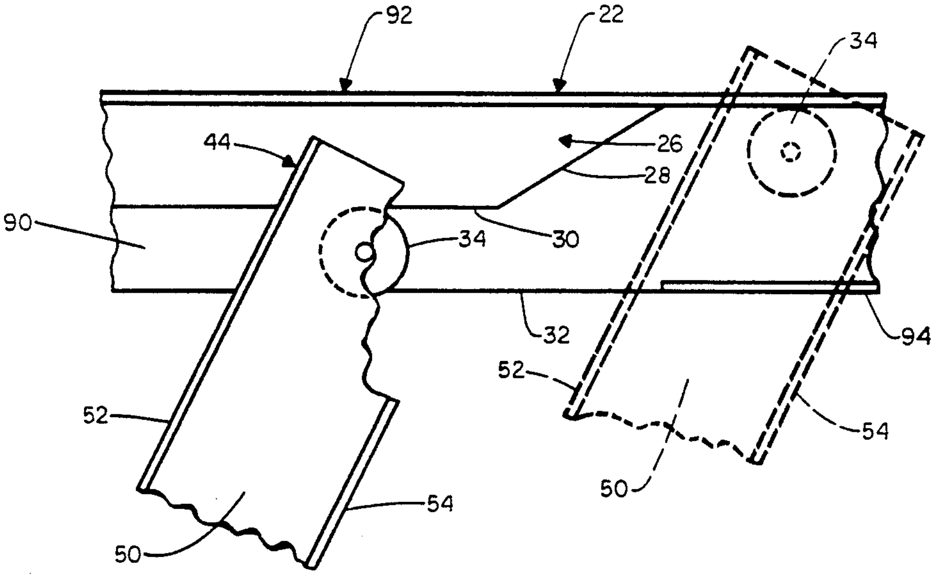
FIG. 3 is a fragmentary, enlarged side view of the upper wheel and rail construction.
Figure 6:
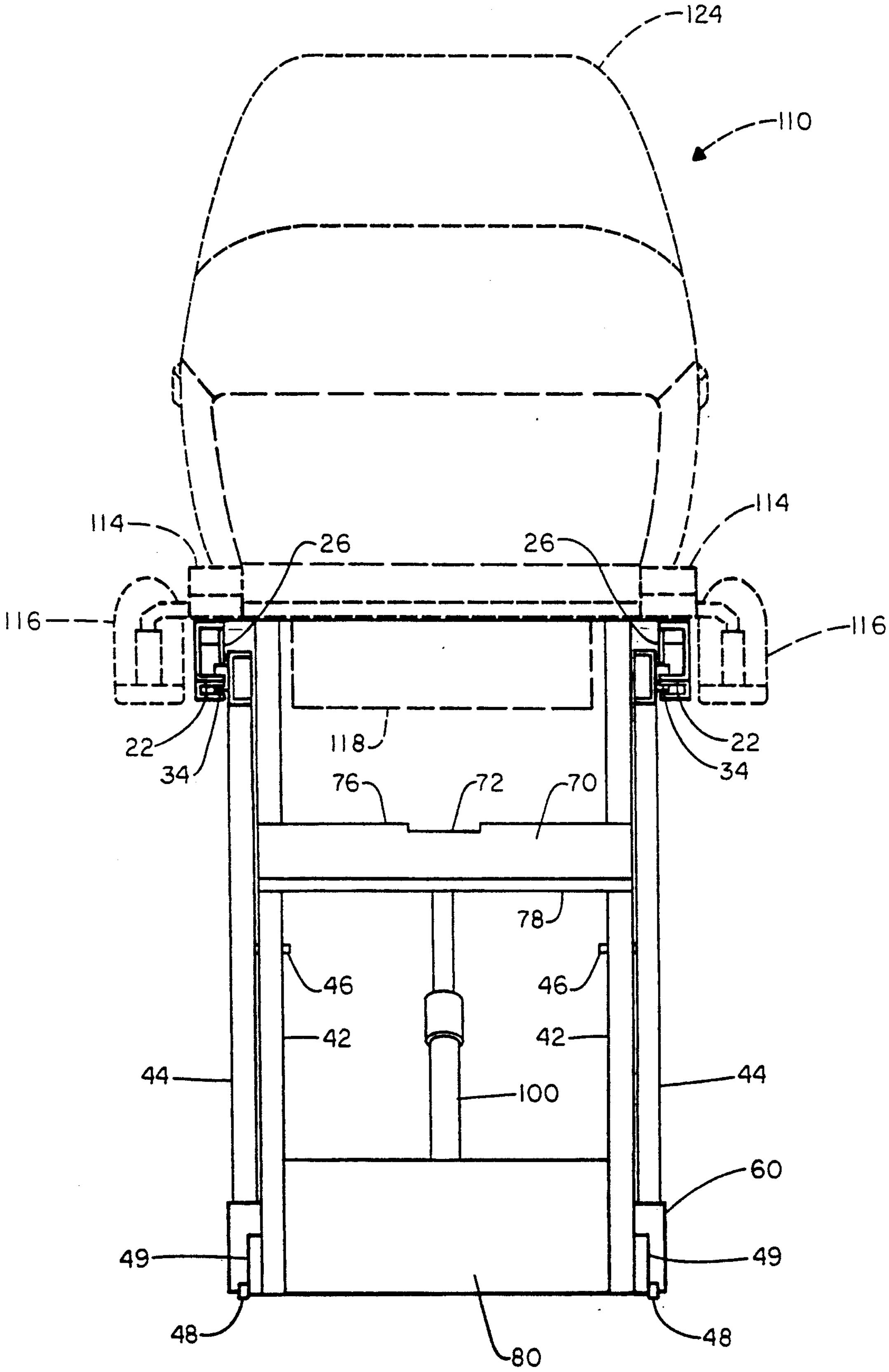
FIG. 6 is a fragmentary view of the bellypan and running board of the snowmobile contacting the second cross member and a rail, respectively.

The rails 22 are further comprised of a ramp 26 (FIG. 3) rigidly mounted to the rail 22. The upper wheels 34 ride on the ramp 26 to raise the rear of the rails 22 higher than the front of the rails 22, assuring the rails contact the frame 112 or running boards 114 of the snowmobile 110 (FIG. 6). Preferably, the ramp 26 has an inclined plane 28 and a horizontal track 30, and the ramp 26 is rigidly mounted to the underside of the upper flange 92 of the rail 22. In the preferred embodiment, the upper wheels 34 associated with the second arms 44 contact the inclined plane portion 28 of the ramp 26 and raise the rear of the rails 22 higher than the front of the rails 22.

A notch 32 in the lower flange 92 of the rail 22 is disposed below the ramp 26. The upper wheel 34 of second arm 44 extends through the notch 32 as the upper wheel 34 rides on the inclined plane 28 and the horizontal track 30. It should be noted that if a smaller diameter upper wheel 34 were selected, then the notch 32 would not be necessary.

In use, the snowmobile lift 10 is started from its lowered position as shown in FIG. 2. In the lowered position, the upper flanges 52, 92 of the rails 22, first arms 42 and second arms 44 all lie in the same plane. The snowmobile 110 is then driven or moved over the lift frame 20, and the skis 116 of the snowmobile 110 straddle the rails 22 of the lift frame 20 and the track 118 of the snowmobile 110 lies between the rails 22 (FIG. 5). As the lift frame is raised by the opening of the scissor members 40, at least one of the cross members 24, 25 contact the snowmobile's bellypan 120 and the rails 22 contact the snowmobile's running boards 114, leaving the skis 116 and tracks 118 of the snowmobile free for maintenance (FIGS. 1, 5, 6).

To raise the lift frame 20, the hydraulic cylinder 100 is extended resulting in a moment being applied about the pivot point 110 which causes the scissor members 40 to open up. As the scissor members 40 open, the wheels 34 ride on the underside of the upper flange 92 of the rails 22 where the wheel contacts and continues to ride along the inclined plane 28 and the horizontal track 30 of the ramp 26, causing the rear of the rails 22 to raise higher than the front of the rails 22, thus assuring the rails make contact with the frame 112 or running boards 114 of the snowmobile 110. As the scissor members continue to open, the lower wheels 48 ride along the ground or floor in a direction towards the front of the snowmobile lift 10. Simultaneously, the upper end of the first arms 42 rotate with respect to the mounting rod 36.

In its raised position, the snowmobile 110 is supported at its bellypan 120 by at least one of the cross members 24, 25 and at its frame 112 or running boards 114 by the rails 22, leaving the track 118 and skis 116 of the snowmobile 110 freely accessible for maintenance (FIGS. 1, 5, 6).

It should be noted that the lift as described is not limited to contacting the snowmobile 110 only on the bellypan 120 by the cross members 24, 25. It is possible that the snowmobile 110 may contact only one of the cross members 24, 25 and the rails 22, or the snowmobile 110 may contact both cross members 24, 25 and the rails 22.

Reasonable variation and modification are possible within the scope of the foregoing specification and drawings without departing from the spirit of the invention.

I claim:

1. A lift mechanism for a snowmobile having a frame, running boards, a belly pan, a track and skis, all of predetermined dimensional relationships; the lift mechanism having a lift frame adapted to support a snowmobile, a mechanism for raising the lift frame from a lowered positioned to a raised position; the improvement which comprises:

the lift frame having a pair of spaced apart, parallel rails which are joined to a pair of crossmembers;

one crossmember is positioned at one end of the rails and the other crossmember is positioned at a central portion of the rails a sufficient distance from the other end of the rails so that the snowmobile track is free from the other cross member; the lift frame further being free from crossmembers at a rear portion of the lift frame between the other crossmember and the other end of the lift frame, and the crossmembers are positioned such that at least one of the crossmembers supports the snowmobile frame or belly pan and leaves the skis and track suspended for servicing.

2. A lift mechanism for a snowmobile according to claim 1 wherein the spacing of the rails is narrow enough so that the skis of the snowmobile will straddle the rails.

3. A lift mechanism for snowmobile according to claim 2 wherein the spacing of the rails is far enough apart that the track of the snowmobile lies between the rails.

4. A lift mechanism for a snowmobile according to claim 3 wherein the lift frame in its lowered position lies on a floor support surface.

5. A lift mechanism for a snowmobile according to claim 4 wherein the lift mechanism comprises at least two scissor members which are connected at an upper end to the lift frame.

6. A lift mechanism for a snowmobile according to claim 5 wherein each scissor member is comprised of first and second arms which are pivotably mounted to each other and one of the arms is pivotably connected at an upper end to a front portion of the lift frame.

7. A lift mechanism for a snowmobile according to claim 6 wherein the upper portion of the other arm of the scissor member is movably mounted to an upper portion of the lift frame.

8. A lift mechanism for a snowmobile according to claim 7 wherein wheels are mounted to the upper portion of the other arm of the scissor member for rolling interface between the other arm and the lift frame rails.

9. A lift mechanism for a snowmobile according to claim 8 and further comprising a ramp mounted to each of the rails for rolling contact with the wheels to raise one end of the rails higher than the other end, thereby assuring contact between the rails and the snowmobile frame or running boards.

10. A lift mechanism for a snowmobile according to claim 9 wherein the lift mechanism raises the lift frame other end as the lift frame moves from the lowered position to the upper position.

11. A lift mechanism for a snowmobile according to claim 1 wherein the mechanism for raising and lowering the lift frame further comprises scissor members, each scissor member having first and second arms; a fluid cylinder connected at one end to at least one of the first and second arms and at the other end to the other of the first and second arms to pivot the first and second arms with respect to each other and to raise and lower the lift frame.

12. A lift mechanism for a snowmobile according to claim 11 wherein the first arms of each scissor member are connected to each other and the second arms of each scissor member are connected so that the first and second arms move respectively as a unit.

13. A lift mechanism for a snowmobile according to claim 12 wherein the first arms of each scissor member are connected to each other by a mounting bracket and one end of the fluid cylinder is pivotably connected to the mounting bracket.

14. A lift mechanism for a snowmobile according to claim 13 wherein the second arms are connected by a second mounting bracket and the other end of the fluid cylinder is pivotably connected to the second mounting bracket.

15. A lift mechanism for a snowmobile according to claim 14 further comprising wheels mounted to a free end of the first arm of the scissor members for rolling contact of the first arms on a floor surface.

16. A lift mechanism for a snowmobile according to claim 1 wherein the lift mechanism has means to raise one end of the lift frame higher than the other end of the lift frame by raising one end of the rails higher than the other, thereby assuring contact between the rails and the frame or running boards of the snowmobile.

17. A lift mechanism for a snowmobile having a frame with a bellypan, a track and two skis, all of predetermined dimensional relationships; the lift mechanism having a lift frame adapted to support a snowmobile, a mechanism for raising the lift frame from a lowered positioned to a raised position; the improvement which comprises:

the lift frame having a pair of spaced apart, parallel rails which are joined to a pair of cross members;

the rails are spaced apart a distance narrow enough so that the skis of the snowmobile will straddle the rails and the snowmobile will be supported independently of the skis; and a rear portion of the lift frame is free of crossmembers between a central portion of the lift frame to an end of the lift frame so that the snowmobile track is free of crossmembers.

18. A lift mechanism for a snowmobile according to claim 17 wherein the rails are spaced far enough apart so that the track of the snowmobile lies between the rails.

19. A lift mechanism for a snowmobile according to claim 18 and further comprising cross members attached to the rails so at least one of the cross members will support the frame of the snowmobile when the lift is in the raised position.

20. A lift mechanism for a snowmobile according to claim 18 wherein the snowmobile has a pair of running boards which are adapted to rest on the rails when the lift is in the raised position.

* * * * *